United States Patent Office 3,552,035
Patented Jan. 5, 1971

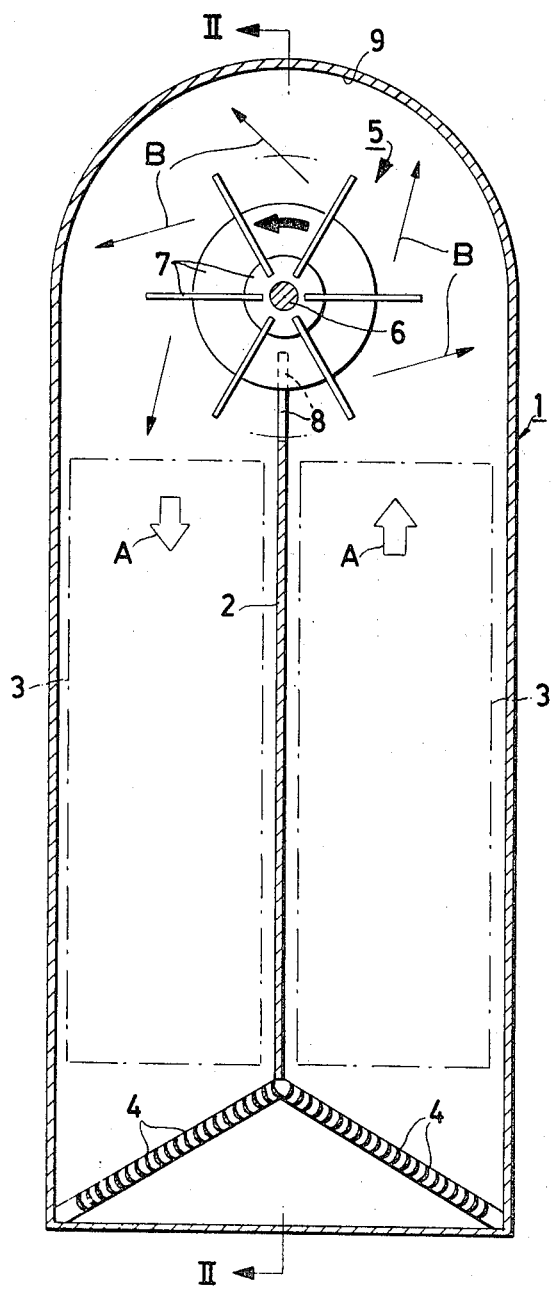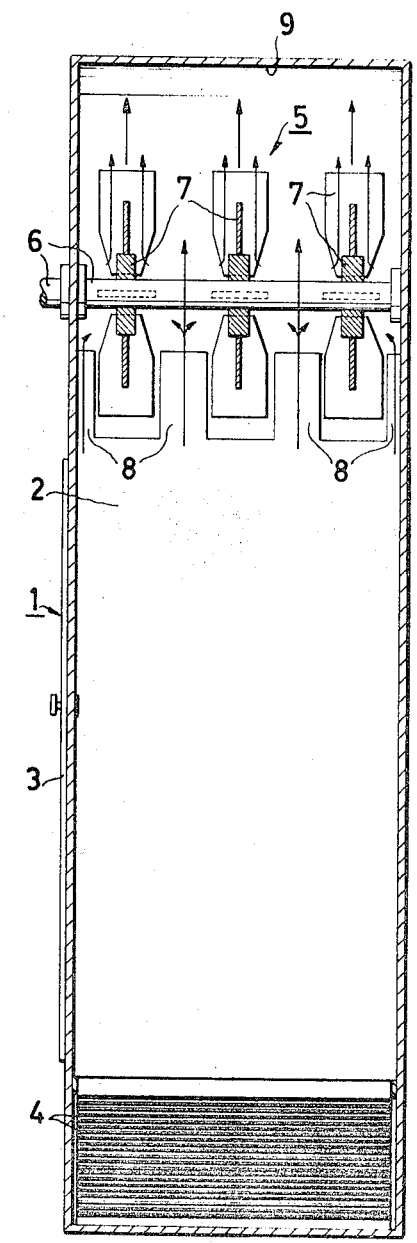

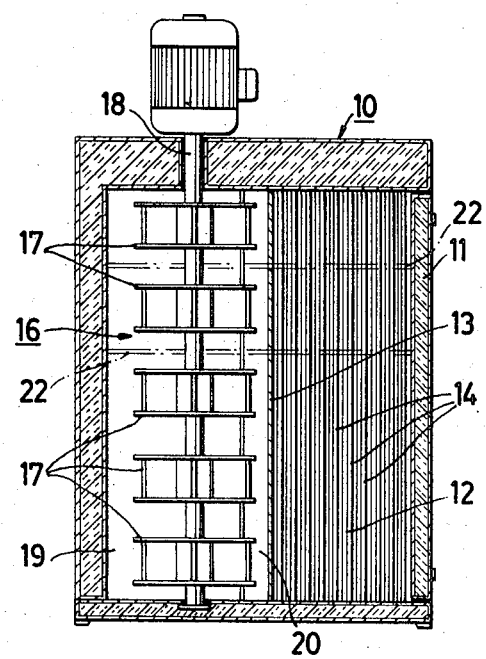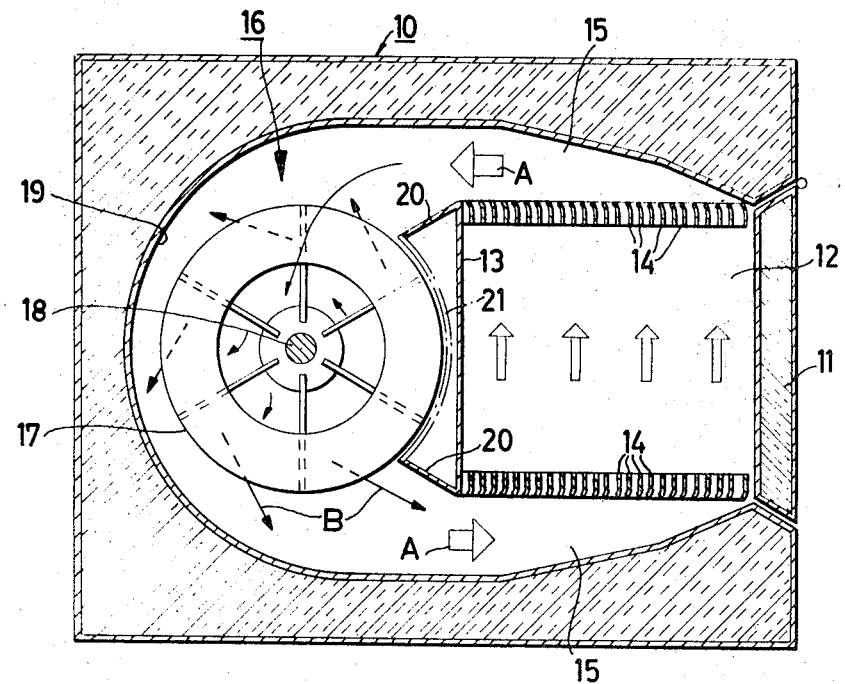

3,552,035
APPARATUS FOR TREATING GOODS WITH A HEATED GASEOUS MEDIUM
Gosta Robert Olin, Saltsjo-Duvnas, Sweden, assignor to Norrmalms Industrier Aktiebolag, Saltsjo-Duvnas, Sweden, a Swedish joint-stock company
Filed Apr. 16, 1969, Ser. No. 816,569
Claims priority, application Sweden, Apr. 29, 1968, 5,770/68
Int. Cl. F26b 21/06
U.S. Cl. 34—191                    7 Claims

ABSTRACT OF THE DISCLOSURE

An apparatus for treating goods with a heated gaseous medium includes at least one compartment for receiving the goods to be treated and a reversible blower unit for circulating the medium therethrough, and the blower unit of the apparatus comprises a reversible rotor having one or more radial impellers, and a stationary, symmetrical casing surrounding the rotor and having a pair of circumferentially spaced openings communicating with the goods receiving compartment, there being no rotary or otherwise movable valve means co-operating with the rotor for directing the medium flow to or from the same and the direction of medium flow through the compartment being solely determined by the selected direction of rotation of the rotor itself.

---

This invention relates to apparatus for treating goods with a gaseous medium, such as warm or hot air, possibly with the addition of steam or smoke, and of the kind including at least one compartment adapted to receive the goods to be treated and a reversible blower unit for circulating the treating medium through said compartment in a manner to permit reversal of the direction of medium flow therethrough at selected time intervals in order to achieve the best possible uniformity of treatment of the goods contained therein.

Apparatus of this kind, which are frequently called cabinets or ovens, can advantageously be used for thawing frozen foods, for cooking, baking and smoking foods, for baking breads and cakes, and for many other similar heating tasks within the food industry, in restaurants, and in any other place where food is to be prepared. However, the use of such apparatus is not necessarily restricted to the treatment of articles of food but may as well be extended to drying, heating and even sterilizing other types of goods, such as clothes and washing, medical and surgical accessories, and laboratory preparations, for example.

More specifically the invention is concerned with an improved blower unit for use in apparatus of the kind referred to above, and it is the main and general object of the invention to provide a blower unit, which is considerably more simple in construction, less expensive and more reliable in use than previously known blower units for the same purpose.

The improved blower unit embodying the invention is of the type comprising a reversible rotor including at least one impeller means having radially extending and axially aligned vanes, and a stationary casing surrounding the rotor, being symmetrical with respect to an imaginary plane extending through the axis thereof and comprising, in addition to axially spaced end walls, a main wall member, which is substantially U-shaped when viewed in the axial direction of the rotor and has side wall portions projecting on opposite sides of the rotor in radially spaced relationship thereto, and a second wall member located intermediate said side wall portions of the main wall member and separated therefrom in a manner to form spaced, substantially rectangular openings in the casing, which communicate with the goods receiving compartment and serve alternatingly, responsive to the direction of rotation of the rotor, as an inlet to and an outlet from the interior of the blower casing for the treating medium.

Blower units of this type have previously been used in apparatus of the kind referred to hereinabove but then with a sort of rotary valve housing, which at least partially surrounds the rotor inside the blower casing and which is adapted to be rotated about an axis parallelling that of the rotor, each time the direction of medium flow through the blower casing and hence the goods receiving compartment is to be reversed and the direction of rotation of the blower rotor is reversed for the same purpose.

These valve housings used in the previously known blower units are not only rather complex, heavy and expensive in themselves but also difficult to install. They also need considerable service to operate properly. Accordingly the use of such valve housings is highly objectionable, but up to now there seemed to be no way of avoiding them in the type of blower units referred to.

Now the present invention is based on the surprising discovery that the valve housing mentioned above is not necessary at all and can be dispensed with, provided that the blower casing is of the construction mentioned hereinbefore, i.e. is so formed that the medium conveying duct forms a marked bend where the rotor is located. Accordingly, it is the main feature of the invention that the rotor is the only movable component of the blower unit having any substantial influence on the conveyance and flow of the treating medium therethrough, and that the impeller means of the rotor is or are permanently exposed towards the interior of the blower casing on both sides of the beforementioned imaginary plane of symmetry and arranged so as to leave open passage for the treating medium through the blower casing between the spaced openings thereof.

It is true that the efficiency of such a blower unit operating without any valve means is slightly lower than that of a similar blower unit having valve means of previously known types, but this is of no significant importance, because the additional power required will be transferred into heat which is only beneficial to the medium, and a corresponding reduction of the capacity of the heating elements, which are obviously provided for heating the treating medium, is of course possible.

For further elucidation of the invention two embodiments thereof will now be described with reference to the accompanying drawings, wherein:

FIG. 1 is a sectional elevation of a first form of a cabinet for treating foods with a heated gaseous medium and including a blower unit according to the invention, FIG. 2 is a section taken along the line II—II of FIG. 1, FIG. 3 is a longitudinal sectional elevation of a second form of treating cabinet or oven wherein a blower unit embodying the invention is located rearwardly of the compartment adapted to receive the goods to be treated, and FIG. 4 is a horizontal section of the cabinet of FIG. 3 shown on an enlarged scale.

It should be readily understood that there are no limitations as far as the location of the blower unit within the cabinet is concerned so that, for instance, the cabinet shown in FIGS. 1 and 2 may be inverted or laid on its side or its back, if so desired. Also the blower unit shown in FIGS. 3 and 4 may be used in cabinets or ovens of other design and with its rotor axis having a horizontal or even inclined position.

In the embodiment illustrated in FIGS. 1 and 2 the reference numeral 1 generally designates a cabinet having its interior divided into two compartments by means of a partition 2. Access to the interior of the cabinet may be had through a pair of doors 3 indicated by dash-and-dot lines in FIG. 1. The lower edge of the partition 2 is spaced from the bottom of the cabinet 1, and oblique series of guide vanes 4 are provided between the lower edge of the partition and the respective lower corners of the cabinet, as shown in FIG. 1, in order to ensure favorable flow conditions for a gaseous medium passing from the one side of the partition to the other, irrespective of the direction of flow. The guide vanes 4 may, for instance, be electrically heated in order to maintain the treating medium circulating in the cabinet at the desired temperature, or a suitable heating element (not shown) may be located between the series of guide vanes for the same purpose.

The upper portion of the cabinet 1 forms, in fact, part of a blower unit and accommodates a rotor, which is generally designated by numeral 5 and which comprises a plurality of axially spaced radial impeller means 7 carried by a common driving shaft 6 which, in a manner not shown, is driven by a suitable motor and capable of having its direction of rotation reversed at selected time intervals. The impeller means 7 of the rotor 5 have radially extending and axially aligned vanes so that they can operate equally well in both directions of rotation. The axis of the rotor coincides with an imaginary extension of the plane of the partition 2, and the length of the rotor 5 and the number of impellers thereon is so selected that the rotor will substantially uniformly actuate the air in the entire length or depth of the cabinet (see FIG. 2). The upper edge portion of the partition 2 extends very close to the circumference of the impeller means 7 of the rotor and the partition has projections 8 entering the spaces between the impeller means, as shown. These projections are not necessary for obtaining the desired operation of the blower unit but have been found to somewhat improve the efficiency thereof. The top of the cabinet 1 forms an arcuate or U-shaped main wall member 9 extending over the rotor 5 and being fully symmetrical with respect to an imaginary plane extending through the axis of the rotor and coinciding with the partition 2, and this wall member 9 has side wall portions smoothly merging into the corresponding side walls of the cabinet 1. As can be seen particularly from FIG. 1, the wall member 9 is radially spaced from the rotor and more specifically from the impeller means thereof by a distance which is considerably larger than would be necessary only to prevent mechanical contact and also larger than the distance between the impeller means and the upper edge portion of the partition 2.

Although in the case illustrated in FIGS. 1 and 2 the curve formed by the arcuate main wall member 9 is substantially semicircular and has a centre axis which coincides with the axis of the rotor 5, this is to be considered as a rather extreme arrangement. In practice it has been found possible and advantageous, not the least in order to save space, to reduce the distance between the uppermost middle portion of the wall member 9 and to let the radial distance between the rotor and the wall member gradually increase towards both sides of the rotor. If this is done, the minimum distance may be about one tenth of the rotor diameter. Also it should be kept in mind that the wall member 9 can form any smooth and symmetrical curve and not necessarily a circular one.

It should be noted from FIGS. 1 and 2 that there is no need for any movable or rotary valve housing or any other movable part in addition to the rotor 5 and, of course, the motor and transmissions (not shown) required to drive the same. Consequently, the rotor 5 will permanently be exposed towards the interior of the blower casing formed by the upper part of the cabinet and, as can be seen, the impeller means will leave open passage for the treating medium through the casing between the two downwardly directed openings thereof which communicate with the compartments for the goods to be treated, i.e. the interior of the cabinet inside the doors 3.

When the rotor 5 is caused to rotate in the counterclockwise direction as indicated in FIG. 1, the air in the cabinet will be circulated very effectively in the direction indicated by the arrows A. The explanation to this seems to be that there occurs a flow pattern composed of substantially radial, inwardly directed flow between the impellers and of radial, outwardly directed flow within the impellers of the rotor, the latter flow receiving a tangential component of motion from the rotation of the impellers. Accordingly, the air from the impellers will be thrown out approximately in the directions indicated by the arrows B in FIG. 1, which will probably create a sort of ejector action in the bent medium conveying duct of the blower unit, above all between the rotor itself and the arcuate main wall member 9. At the same time a part of the air flowing in between the impellers from the suction side, which in this case is the right hand one in FIG. 1, will, of course, more or less directly continue out to the pressure side within or in the vicinity of the impellers, so that a combination of ejector blower and cross flow blower operation may be said to result. Because of the fully symmetrical design of the blower unit, an identical but mirror-reversed flow pattern will occur, when the direction of rotation of the rotor is reversed. The presence of the partition 2 is in this connection very important, because to some extent it may be compared to a stationary "scraper" interrupting and directing the air flow and the ejector operation.

The cabinet or oven shown in FIGS. 3 and 4 is provided with a blower unit which is somewhat modified as compared to that shown in FIGS. 1 and 2. Also the cabinet 10 itself is of a modified type comprising well-insulated walls and an insulated door 11 giving access to an interior space or room 12 in which the articles of food or other goods to be treated are intended to be introduced for example on plates or trays, not shown. Towards the rear as counted from the door 11 the room 12 is bounded by a partition 13 and laterally it is bounded by series of vertically extending guide vanes 14 forming a sort of grated walls and being of such design as to ensure a substantially uniform and crosswise air flow through the room 12 between lateral duct portions 15 located outside the respective series of guide vanes 14, the cross sectional or flow area of these lateral ducts 15 increasing gradually in the direction from the foremost portion of the cabinet towards the rear and towards openings provided on both sides of the partition 13.

The partition 13 forms the front wall of the blower unit of the cabinet, and the rotor 16 thereof, which also in this case includes a plurality of axially spaced impellers 17 mounted on a common shaft 18, is vertically arranged behind the partition 13 and in a medium conveying duct forming a marked bend in the horizontal plane between the two lateral duct portions 15. This medium conveying duct is bounded by an arcuate main wall member 19 which forms a smoothly rounded or curved continuation of the respective outer walls of the lateral duct portions 15. On opposite sides of the rotor the partition 13 has rearwardly directed side wall portions 20 extending in planes converging towards the rotor and coming rather close to the circumference of the impellers thereof. In this way the partition 13 will take the form of a trough partially enclosing the rotor circumference and, preferably but not necessarily, a curved bottom member 21 may be arranged between the side wall portions 20 to extend close to but out of mechanical contact with the impellers of the rotor, as shown by dash-and-dot lines in FIG. 4.

It should be readily understood that the number of axially spaced impellers 17 on the rotor shaft 18 can be varied in order to give the desired uniformity of the air flow. In certain cases, if the cabinet is only a small one, one single impeller may be sufficient. There is also a possibility to divide the room 12 and the blower unit of a larger cabinet into smaller sections or compartments by horizontally extending intermediate wall or bottom members as indicated by dash-and-dot lines at 22 in FIG. 3. As can be seen particularly from FIG. 4, the radial distance between the rotor impellers 17 and the main wall member 19 of the blower unit is small in the plane of symmetry of the blower unit but increases gradually towards both sides thereof. In this case as well as in that shown in FIGS. 1 and 2 the impellers are provided with radially extending and axially aligned vanes so as to be capable to operate in both directions of rotation with the same efficiency. This is, of course, important in order to obtain the desired result.

The manner of operating of the blower unit of the cabinet shown in FIGS. 3 and 4 is substantially the same as has been already described with reference to FIGS. 1 and 2 but with the difference that the portion of the rotor enclosed by the troughlike wall member 13, 20 and, possibly, 21 is to be considered inactive. Thanks to the symmetrical design, identical but mirror-reversed flow patterns will occur, when the direction of rotation of the rotor is reversed. Irrespective of the direction of rotation of the impellers, the one side wall portion 20, viz the one on the pressure side, will operate, similarly to the partition 2 in FIG. 1, as a kind of "scraper" interrupting the ejector action and directing the flow of air away from the rotor. The purpose of the curved bottom member 21, if provided, is to prevent the rotor from throwing in air and creating eddy currents in the pockets which are formed between the partition 13 and the side wall portions 20 thereof. Although not shown in FIGS. 3 and 4, the second trough-like wall member formed by the partition 13, its side wall portions 20 and, possibly, the bottom member 21, may also have projections entering the spaces between the rotor impellers on the one side of the rotor shaft, as do the projections 8 in FIGS. 1 and 2.

As can be seen from FIGS. 3 and 4 there is no rotary or otherwise movable valve means needed for co-operation with the rotor 16, and the impellers 17 thereof are permanently exposed towards the interior of the blower casing on both sides of the plane of symmetry thereof. It can also be seen that the impellers 17 leave open passage for the treating medium both externally and axially of them.

It should be obvious without any further explanations that several modifications of the design, size and detailed construction of the parts are feasible within the scope of the appended claims. Heating of the medium to be circulated can be accomplished by any suitable means which are well known in the art, and steam or smoke may be introduced in the cabinet through suitably arranged openings.

I claim:

1. An apparatus for treating goods with a heated gaseous medium including at least one compartment adapted to receive the goods to be treated, and a reversible blower unit for circulating the treating medium through said compartment in a manner to permit reversal of the direction of the medium flow therethrough at selected time intervals, wherein the blower unit comprises a reversible rotor including at least one impeller means having radially extending and axially aligned vanes, and a stationary casing surrounding the rotor and being symmetrical with respect to an imaginary plane extending through the axis thereof, said casing comprising a main wall member, which is substantially U-shaped when viewed in the axial direction of the rotor and has side wall portions projecting on opposite sides of the rotor in radially spaced relationship thereto, and a second wall member located intermediate said side wall portions of the main wall member and separated therefrom in a manner to form spaced, substantially rectangular openings in the casing communicating with the goods receiving compartment and serving alternatingly, responsive to the direction of rotation of the rotor, as an inlet to and an outlet from the interior of the blower casing for the treating medium, said rotor being the only movable component of the blower unit having any substantial influence on the conveyance and flow of the treating medium therethrough, and said impeller means of the rotor being permanently exposed towards the interior of the blower casing on both sides of said imaginary plane of symmetry and arranged so as to leave open passage for the treating medium through the blower casing between said openings thereof.

2. An apparatus according to claim 1, wherein the second wall member of the blower casing has at least an edge portion extending in the axial direction of the rotor and closer to the circumference of the impeller means therefrom than the main wall member.

3. An apparatus according to claim 1, wherein the rotor of the blower unit has a plurality of axially spaced impeller means, and wherein the openings formed in the blower casing are extended in the axial direction of the rotor.

4. An apparatus according to claim 3, wherein the second wall member of the blower casing is formed with projections entering the spaces between the impeller means of the rotor.

5. An apparatus according to claim 1, wherein the second wall member of the blower casing is an edge portion of a partition having its main extension in the plane of symmetry of the blower casing.

6. An apparatus according to claim 1, wherein the second wall member of the blower casing is in the form of a trough partially enclosing the rotor.

7. An apparatus according to claim 6, wherein the trough forming the second wall member of the blower casing has side wall portions converging towards the rotor.

References Cited
UNITED STATES PATENTS 1,499,627 7/1924 Thelen.
3,065,553 11/1962 Olin.

FREDERICK L. MATTESON, Primary Examiner

H. B. RAMEY, Assistant Examiner

U.S. Cl. X.R.

34—212